(12) United States Patent
Chopra et al.

(10) Patent No.: US 8,773,712 B2
(45) Date of Patent: Jul. 8, 2014

(54) REPURPOSING A WORD PROCESSING DOCUMENT TO SAVE PAPER AND INK

(75) Inventors: Harsh Vardhan Chopra, New Delhi (IN); Naveen Goel, Uttar Pradesh (IN); Mayur Hemani, New Delhi (IN); Hemant Virmani, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 287 days.

(21) Appl. No.: 12/849,417

(22) Filed: Aug. 3, 2010

(65) Prior Publication Data

US 2013/0128314 A1 May 23, 2013

(51) Int. Cl.
*G06K 1/00* (2006.01)
*G06K 15/02* (2006.01)
*G06K 15/00* (2006.01)
*G06F 3/12* (2006.01)
*G03G 15/00* (2006.01)

(52) U.S. Cl.
USPC ........... 358/1.9; 358/1.2; 358/1.14; 358/1.15; 358/1.16; 399/24

(58) Field of Classification Search
None
See application file for complete search history.

(56) References Cited

U.S. PATENT DOCUMENTS

| | | | |
|---|---|---|---|
| 6,128,655 A | 10/2000 | Fields et al. | |
| 6,266,684 B1 | 7/2001 | Kraus et al. | |
| 7,206,784 B2 | 4/2007 | Gu et al. | |
| 7,231,593 B1 | 6/2007 | Raja et al. | |
| 7,237,188 B1 | 6/2007 | Leung | |
| 7,366,981 B2 | 4/2008 | Wu et al. | |
| 7,599,094 B2 | 10/2009 | Sellers et al. | |
| 7,680,858 B2 | 3/2010 | Poola et al. | |
| 7,882,427 B2 | 2/2011 | Raja et al. | |
| 7,907,151 B2 | 3/2011 | Daviss | |
| 8,024,412 B2 | 9/2011 | McCann et al. | |
| 8,085,421 B2 | 12/2011 | Hamilton, II et al. | |
| 8,305,653 B2 | 11/2012 | Austin et al. | |
| 8,397,155 B1 | 3/2013 | Szabo | |
| 8,407,579 B2 | 3/2013 | Raja et al. | |
| 8,451,489 B1 | 5/2013 | Arora | |
| 8,467,082 B1 | 6/2013 | Miller et al. | |
| 2002/0135800 A1 | 9/2002 | Dutta | |
| 2003/0110227 A1 | 6/2003 | O'Hagan | |
| 2003/0163537 A1 | 8/2003 | Rohall et al. | |
| 2004/0017577 A1 | 1/2004 | Ostrover et al. | |

(Continued)

OTHER PUBLICATIONS

"Final Office Action", U.S. Appl. No. 12/849,349, Aug. 19, 2013, 16 pages.

(Continued)

*Primary Examiner* — Thomas Lett
(74) *Attorney, Agent, or Firm* — Wolfe-SBMC

(57) ABSTRACT

A word processing document is repurposed to save paper and ink. An indication is received that a printout of a word processing document from a printer has been requested. Further, the content is segmented into one or more regions according to a set of grouping rules, the set of grouping rules defining a region has having at least one homogeneous characteristic. In addition, one or more potential transformations are filtered for each region to generate one or more filtered potential transformations based on a set of rules that restricts a transformation according to a region type. The region type is determined by the at least one homogeneous characteristic for each region. Further, a cost function is evaluated for each of the one or more filtered potential transformations according to one or more appearance attributes for the word processing document.

20 Claims, 12 Drawing Sheets

(56) References Cited

U.S. PATENT DOCUMENTS

| | | | |
|---|---|---|---|
| 2004/0019699 A1 | 1/2004 | Dam et al. | |
| 2004/0044735 A1 | 3/2004 | Hoblit | |
| 2004/0049730 A1 | 3/2004 | Ishizaka | |
| 2004/0068698 A1 | 4/2004 | Wu et al. | |
| 2004/0205607 A1 | 10/2004 | Kim et al. | |
| 2005/0004990 A1 | 1/2005 | Durazo et al. | |
| 2005/0231758 A1* | 10/2005 | Reynolds | 358/1.15 |
| 2006/0015804 A1 | 1/2006 | Barton et al. | |
| 2006/0167976 A1 | 7/2006 | Brown et al. | |
| 2007/0127064 A1 | 6/2007 | Kuroshima | |
| 2007/0273895 A1 | 11/2007 | Cudd et al. | |
| 2008/0086695 A1 | 4/2008 | Oral | |
| 2008/0137132 A1 | 6/2008 | Perronnin | |
| 2008/0159768 A1* | 7/2008 | Katoh et al. | 399/79 |
| 2008/0288860 A1 | 11/2008 | Daviss | |
| 2009/0063245 A1 | 3/2009 | Anderson | |
| 2009/0100374 A1 | 4/2009 | Sheasby et al. | |
| 2009/0119272 A1 | 5/2009 | Sastry | |
| 2009/0249193 A1 | 10/2009 | Hanechak | |
| 2010/0027051 A1* | 2/2010 | Hamilton et al. | 358/1.15 |
| 2010/0123908 A1* | 5/2010 | Denoue et al. | 358/1.6 |
| 2010/0188681 A1 | 7/2010 | Kawano | |
| 2010/0214614 A1 | 8/2010 | Ferlitsch et al. | |
| 2010/0235456 A1 | 9/2010 | Uchiyama et al. | |
| 2010/0281351 A1 | 11/2010 | Mohammed | |
| 2011/0032562 A1* | 2/2011 | McCuen et al. | 358/1.15 |
| 2011/0043831 A1 | 2/2011 | Sprague et al. | |
| 2011/0145085 A1 | 6/2011 | Khachatrian et al. | |
| 2011/0235064 A1 | 9/2011 | Arai | |
| 2011/0273739 A1* | 11/2011 | Grasso et al. | 358/1.15 |
| 2012/0033237 A1 | 2/2012 | Arora et al. | |
| 2013/0128301 A1 | 5/2013 | Goel et al. | |
| 2013/0128315 A1 | 5/2013 | Arora et al. | |
| 2013/0132812 A1 | 5/2013 | Goel et al. | |
| 2013/0132817 A1 | 5/2013 | Sharad et al. | |

OTHER PUBLICATIONS

"Final Office Action", U.S. Appl. No. 12/849,231, Sep. 26, 2013, 17 pages.

"Final Office Action", U.S. Appl. No. 12/849,231, (Oct. 24, 2012), 11 pages.

"Final Office Action", U.S. Appl. No. 12/849,349, (Oct. 24, 2012), 14 pages.

"Final Office Action", U.S. Appl. No. 12/849,475, (Aug. 20, 2012), 14 pages.

"Invent Wheel: Print What You Like Online Printing", retrieved from <http://www.inventwheel.com/web/articleDetailsByVersion.action?versionId=8> on Jan. 8, 2012, 3 pages.

"Non-Final Office Action", U.S. Appl. No. 12/849,231, (Mar. 18, 2013), 14 pages.

"Non-Final Office Action", U.S. Appl. No. 12/849,231, (May 21, 2012), 12 pages.

"Non-Final Office Action", U.S. Appl. No. 12/849,306, (Oct. 9, 2012), 11 pages.

"Non-Final Office Action", U.S. Appl. No. 12/849,349, (Mar. 18, 2013), 15 pages.

"Non-Final Office Action", U.S. Appl. No. 12/849,349, (May 21, 2012), 14 pages.

"Non-Final Office Action", U.S. Appl. No. 12/849,475, (Jan. 19, 2012), 12 pages.

"Non-Final Office Action", U.S. Appl. No. 12/849,519, (Mar. 1, 2013), 5 pages.

"Notice of Allowance", U.S. Appl. No. 12/849,519, (Apr. 15, 2013), 7 pages.

"PrintWhatYouLike.com", retrieved from <http://www.printwhatyoulike.com/> on Aug. 2, 2010, 2 pages.

Frye, Curtis D., "Excel Annoyances: Print Layout Annoyances", retrieved from <academic.safaribooksonline.com/print?xmlid=0596007280/excelannoyances-CHP-7-SECT-2> on May 14, 2012, 18 pages.

Henry, Alan "Print Friendly for Chrome Lets You Easily Remove Unwanted Web Page Elements Before Printing", retrieved from <http://lifehacker.com5865826/print-friendly-for-chrome-lets-you-easily-remove-unwanted-web-page-elements-before-printing> on Jan. 8, 2012, (Dec. 7, 2011), 3 pages.

Remick, Jarel "Printing Pages with Print What You Like", retrieved from <http://web.appstorm.net/how-to/printing-pages-with-print-what-you-like/> on Jan. 8, 2012, 14 pages.

"Final Office Action", U.S. Appl. No. 12/849,306, (Apr. 25, 2013), 14 pages.

"Final Office Action", U.S. Appl. No. 12/849,475, Dec. 24, 2013, 12 pages.

"Notice of Allowance", U.S. Appl. No. 12/849,306, Nov. 22, 2013, 8 pages.

\* cited by examiner

The Spider of the Cobweb – Understanding Web Crawlers

This one's about a very interesting little invention in computer science. But before we have a rendezvous with the idea itself, here's a short story to set things in motion. It's called the "connected man".

Max and Tom had lived together for four years. They were enrolled in different programs, though in the same university. They were cousins, and shared the apartment in the down-town area. But that's it. That's all they ever shared. Max was a quiet and shy guy who wouldn't bother a fly sitting on his nose, while Tom was like this radio that you could never turn off. Max was quite piqued by the amount of interest Tom generated in the city damsels'. What did they find so attractive in his noisy manner? For him Tom was like this little monster that had just one thing to do – blabber, and blabber some more. And what a successful monster he was! How did he manage to that? Max would ponder all day long. It was the question that haunted him. Do you know what the question is? How does a guy like Tom, who'd be thrown out of a debate competition for exceeding the time-limit for a speaker by a day or two, get to know so many people?

Tom had known it would be difficult. A new guy in town with no connections was like a dead rat in a dump-truck; nobody cared if you moved or not. The problem back then was that he had hardly any money, and without money one can't really go around in high society and make friends. But he was intent on finding a way out. His first problem was that he had no connections. He had to find out how he could even meet more people than he already knew. He thought about getting into the burglary business, but soon gave up the idea when he found out that the police no longer used rubber bullets. He tried working in a food store, but people just did not take notice of him. He even tried joining the

*Figure 5A*

He started off with the few people he knew, and started meeting them more often. He would take them out to coffee shops or pizza houses, and talk to them. He found out about his friends' friends, and their friends. He was careful in not annoying any of the people he met. He did not ask anyone more than once about anybody else. He tried to meet people who were very well connected to others. "Please" was his keyword – and he used it as politely as a politician would to a prospective voter, during the election season. Within a matter of three months, he had so many friends that he had to keep a diary to store all their addresses and phone numbers. People took to him for his polite manners his generosity at the bar, and his patience in listening to their own blabber. In time, he also learnt how to find out if a person was a dead-rat or a social goldfish. He found out that when many people say good things about a person, there's some virtue in knowing the person. He found out that the waiters in the city restaurants talked no end about the generosity of one Mr. Smith. He wasn't a rich person, and yet he possessed riches beyond everything else. He was a historian, an avid traveler and an excellent teacher. Tom soon found out that being in his company was good for his social well-being. How else, for instance, could he have known about the twenty-four different blends of wine which he

Figure 5B

The Spider of the Cobweb – Understanding Web Crawlers

This one's about a very interesting little invention in computer science. But before we have a rendezvous with the idea itself, here's a short story to set things in motion. It's called the "connected man".

Max and Tom had lived together for four years. They were enrolled in different programs, though in the same university. They were cousins, and shared the apartment in the downtown area. But that's it. That's all they ever shared. Max was a quiet and shy guy who wouldn't bother a fly sitting on his nose, while Tom was like this radio that you could never turn off. Max was quite piqued by the amount of interest Tom generated in the city damsels. What did they find so attractive in his noisy manner? For him Tom was like this little monster that had just one thing to do – blabber, and blabber some more. And what a successful monster he was! How did he manage to that that Max would ponder all day long. It was the question that haunted him. Do you know Tom, who'd be thrown out of a debate competition for exceeding the time-limit for a speaker by a day or two, get to know could even meet more people than he already knew. He thought about getting into the burglary business, but soon gave up the idea when he found out that the police no longer used rubber bullets. He tried working in a food store, but people just did not take notice of him. He even tried joining the local junkies but they told him he was too meek to join in with them. So he lay himself down on the bed one night and put his mind to work. How could he meet more people?

There were other troubles. When he did find people to talk to, they were either too short-tempered to listen to him, or just plain bores – the kind of losers he did not want to meet. There was this shoemaker that he met one day at the local bar. He dismissed Tom quite curtly. Later, Tom found out that the only person this bearded honcho ever talked with was the bartender. What was more intriguing was that the only person that the bartender ever talked to was our bearded fellow. In other words, if you got to know one guy, then the only person that you could connect to using him would be the other. He wanted to meet people who were either very up in their own importance, and the well-connected ones wouldn't stop to listen to him. It was, as though, people didn't want him in. He was like a castaway tribesman wandering into the civilized world – nobody really wanted him.

He stared off with the few people he knew, and started meeting them more often. He would take them out to coffee shops or pizza houses, and talk to them. He found out about his friends' friends, and their friends. He was careful in not annoying any of the people he met. He did not ask anyone more than once about anybody else. He tried to meet people who were very well connected to others. "Please" was his keyword – and he used it as politely as a politician would to a prospective voter, during the election season. Within a matter of three months, he had so many friends that he had to keep a diary to store all their addresses and phone numbers. People took to him for his polite manners, his generosity at the bar, and his patience in listening to their own blabber.

Figure 5C

REPURPOSING A WORD PROCESSING DOCUMENT TO SAVE PAPER AND INK

TECHNICAL FIELD

This disclosure generally relates to printing. More particularly, the disclosure relates to the reduction of paper and/or ink utilized for printing.

BACKGROUND

Recent attempts have been made to make technology more environmentally friendly. The resulting technologies are typically called green technologies. For example, green technologies have been developed for computers, automobiles, household appliances, etc.

With respect to computing technologies, a significant environmental concern stems from the printing of paper. Computer users may use computer printers to print large quantities of various types of documents, which typically leads to the use of large amounts of paper. A large demand for paper may lead to the destruction of large quantities of trees, which may have a negative impact on the environment.

As a result, computer users are typically encouraged to reduce the amount of paper utilized for printing by scaling multiple pages down to fit on a single page. A problem with this approach is that the readability and aesthetics of the page are severely hampered. A user may have such a difficult time reading text that has been miniaturized so that two or more pages may fit on one side of a sheet of paper (the other side may also have two or more pages) that the user may simply choose not to utilize green printing and may print in the typical manner, which would not be environmentally friendly.

SUMMARY

In one aspect of the disclosure, a computer program product is provided. The computer program product includes a computer useable medium having a computer readable program. The computer readable program when executed on a computer causes the computer to receive an indication that a printout of a word processing document from a printer has been requested. The word processing document has content with a format that would result in a first quantity of pages being printed. Further, the computer readable program when executed on the computer causes the computer to segment the content into one or more regions according to a set of grouping rules. The set of grouping rules defines a region [[has]] having at least one homogeneous characteristic. In addition, the computer readable program when executed on the computer causes the computer to filter one or more potential transformations for each region to generate one or more filtered potential transformations based on a set of rules that restricts a transformation according to a region type. The region type is determined by the at least one homogeneous characteristic for each region. The computer readable program when executed on the computer causes the computer to evaluate a cost function for each of the one or more filtered potential transformations according to one or more appearance attributes for the word processing document. Further, the computer readable program when executed on the computer causes the computer to apply the one or more filtered transformations to the content for each region such that the printer prints the word processing document with the content in a transformed format that results in a second quantity of pages being printed without falling below a predetermined readability threshold, the second quantity of pages being less than the first quantity of pages.

In another aspect of the disclosure, a process is provided. The process receives an indication that a printout of a word processing document from a printer has been requested. The word processing document has content with a format that would result in a first quantity of pages being printed. Further, the process segments the content into one or more regions according to a set of grouping rules. The set of grouping rules defines a region [[has]] having at least one homogeneous characteristic. In addition, the process filters one or more potential transformations for each region to generate one or more filtered potential transformations based on a set of rules that restricts a transformation according to a region type. The region type is determined by the at least one homogeneous characteristic for each region. Further, the process evaluates a cost function for each of the one or more filtered potential transformations according to one or more appearance attributes for the word processing document. In addition, the process applies the one or more filtered transformations to the content for each region such that the printer prints the word processing document with the content in a transformed format that results in a second quantity of pages being printed without falling below a predetermined readability threshold. The second quantity of pages is less than the first quantity of pages.

In yet another aspect of the disclosure, a system is provided. The system includes a green print module that receives an indication that a printout of a word processing document from a printer has been requested and segments the content into one or more regions according to a set of grouping rules. The word processing document has content with a format that would result in a first quantity of pages being printed. The set of grouping rules defines a region [[has]] having at least one homogeneous characteristic. Further, the system includes a planning module that filters one or more potential transformations for each region to generate one or more filtered potential transformations based on a set of rules that restricts a transformation according to a region type and evaluates a cost function for each of the one or more filtered potential transformations according to one or more appearance attributes for the word processing document. The region type is determined by the at least one homogeneous characteristic for each region. The system also includes a processor that applies the one or more filtered transformations to the content for each region such that the printer prints the word processing document with the content in a transformed format that results in a second quantity of pages being printed without falling below a predetermined readability threshold. The second quantity of pages is less than the first quantity of pages.

DRAWINGS

The above-mentioned features of the present disclosure will become more apparent with reference to the following description taken in conjunction with the accompanying drawings wherein like reference numerals denote like elements and in which:

FIG. 5A illustrates an example of a first page of a word processing document in an original format.

FIG. 5B illustrates an example of a second page of the word processing document in the original format.

FIG. 5C illustrates a word processing green document after green printing transformations have been applied to the first page and the second page of the word processing document in the original format.

DETAILED DESCRIPTION

Figure 1:
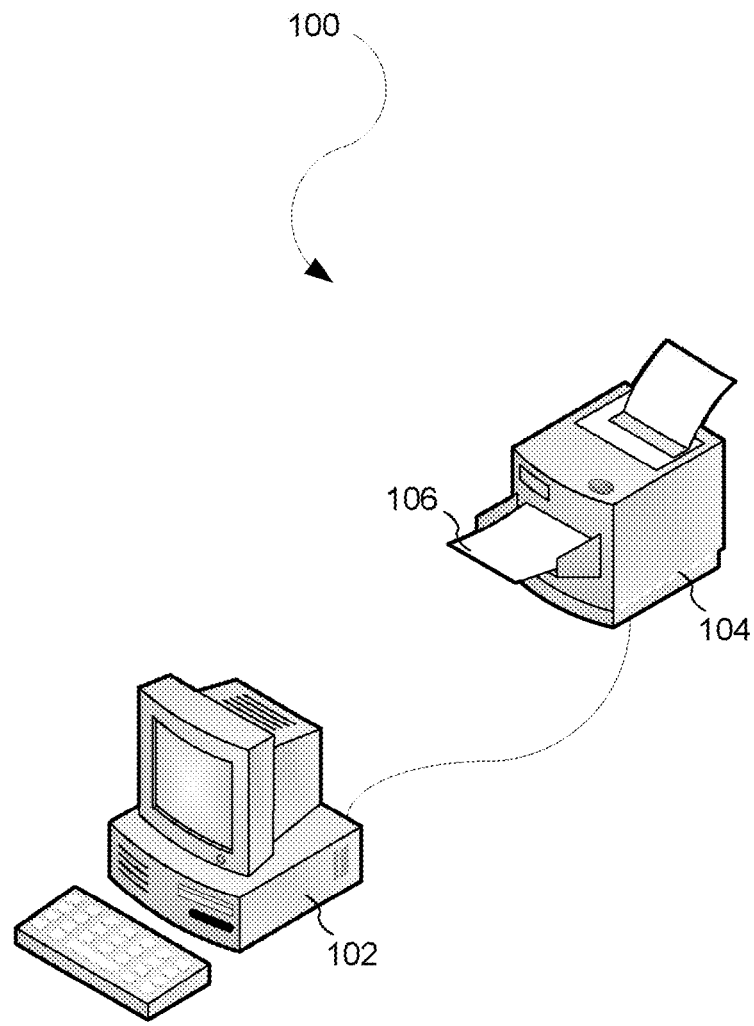
FIG. 1 illustrates a green printing configuration.

A green printing configuration is provided herein that repurposes a word processing document to save paper and/or ink. The green printing configuration is a configuration that reduces the number of pages and/or ink utilized to print a word processing document through content repurposing, which is an approach that transforms content and the formatting of the content to shrink the size of the content to fit into fewer pages at the same time as retaining the readability and aesthetics of the document. The green printing configuration may be a method, system, computing device, computer program stored on a computing device, computer program stored on a printer, computer module that may be downloaded through a network, plug-in, extension, etc. In one embodiment, a user may print in a single click to a default printer so that the content takes up fewer pages and less ink than a typical printed document.

A word processing document may have content elements such as text, etc. Further, a word processing document may have non-content elements such as layout constraints, text formatting, fonts, and spacing elements. Examples of layout constraints include page dimension, margins, gutters, and orientation. Each element contributes to the overall appearance of a document. With respect to printing, the content in a word processing document cannot be significantly changed as the user will likely want to print the content in the document. Accordingly, the green printing configuration maintains the content as a constant during the green printing of a word processing document.

The non-content elements primarily contribute to the visual appearance of the word processing document. For example, the non-content elements may function as separators for blocks of content, signifiers of importance, signifiers of relevance, and/or markers of relatedness. These non-content elements are the elements of formatting in the document. The word processing document formatting contributes to certain redundancies in the document by making the word processing document occupy more space. The green printing of a word processing document utilizes these redundancies in a manner that provides a quantifiable trade off between the number of pages and/or the amount of ink utilized by the content and the overall appearance of the word processing document.

A word processing document may have three types of redundancies. First, the word processing document may have a redundancy that affects that number of pages occupied by the content. Second the word processing document may have a redundancy that affects the amount of ink utilized to print the document. Finally, the word processing may have a redundancy that affects both the paper and the ink.

Word processing documents have redundancies that are specific to a word processing document and are different than other types of documents such as spreadsheets, presentations documents, etc. A word processing document may be considered a flow document, which is a paginated document with a left-to-right (for Latin script documents) and top-to-bottom layout of content. Other types of documents, e.g., documents in different languages, may be paginated differently. A flow document may have blank lines, margins, paragraph spacing, etc. that add to the number of pages utilized for a printout.

Content repurposing may minimize or eliminate redundant white space in a word processing document. Further, content repurposing may reduce the size of large text in a word processing document. In other words, content repurposing automatically adjusts the format of the content according to the adjustments that a user would most likely want to see in order to reduce the number of pages in the document so that the user can still comfortably read the document.

The transformations utilized for content repurposing have the goal of reducing the overall redundancy in a document. Although a group of transformations together may reduce the redundancy, one or more of the transformations may individually increase the redundancy. The redundancy for an individual transformation may be increased to accentuate certain characteristics of the document to add to the aesthetic appeal and/or readability of the document. For example, if and when a document is printed with multiple pages per paper sheet, a green print program may automatically decide to increase the size of the text to make the text more readable.

A transformation may have a magnitude associated therewith. In one embodiment, the magnitude may be binary. The binary magnitude may indicate whether a transformation is applied [[is]] or not applied, e.g., "0" equals transformation is not to be applied and "1" equals transformation is to be applied. In another embodiment, the magnitude may have a set of predefined discrete values. In another embodiment, the magnitude may take continuous values.

Each instance of a transformation type may have a transformation cost associated therewith for a particular document type. In other words, a particular sizing transformation may have a different transformation cost for a word processing document than for a spreadsheet.

Further, each transformation may have an associated saved paper quantity. For example, a particular textual transformation may save one tenth of a sheet of paper. In addition, each transformation may have an associated saved ink quantity. For example, a particular textual transformation may save one half an ounce of ink. The transformation may potentially have both a saved paper quantity and a saved ink quantity if both paper and ink would be saved as a result of the transformation.

FIG. 1 illustrates a green printing configuration 100. As an example, a computing device 102 is illustrated as a PC. Further, as an example, the computing device 102 is operably connected to a printer 104 through a wireline connection. The term computing device 102 is herein intended to include a personal computer ("PC"), desktop computer, laptop, notebook, cell phone, smart phone, personal digital assistant ("PDA"), kiosk, etc. Further, the computing device 102 may be a client, server, network device, etc. The printer 104 may be a printing device that is separately connected, e.g., through a wireline or wireless connection, to the computing device 102, built into the computing device 102, etc. A wireless connection may receive and/or send data through a Radio Frequency ("RF") transmission, an Infrared ("IR") transmission, or the like. The printer may or may not be part of a network. Further, the printer 104 may utilize any type of printing methodology to print on paper 106, e.g. laser printing, ink jet printing, or the like.

In one embodiment, a flow document has a story-based layout. For word processing documents in languages such as English, the content flows from top to bottom and left to right. Word processing documents in other languages may have a content flow in different directions. A story may have a plurality of sections such that each section has a paragraph. Further, a paragraph may have runs of text and shapes. A run is the smallest unit of formatting. A block of runs may have its own formatting attributes. Shapes may include text, graphics, images, or the like. Redundancies in the flow documents occur in several different forms including, but not limited to the following: white space between blocks of content and/or on the peripheries of the blocks of content, large text adding both to the number of pages and ink of a printout, redundant shape fills, large images, and/or large shapes.

Based on the document formatting attributes for a flow document, the green print configuration 100 may be utilized to perform a variety of different transformations. These transformations include, but are not limited to the following: removing blank lines, reducing margins, reducing paragraph spacing, reducing line spacing, reducing table cell padding, removing page breaks, removing section breaks, shrinking headers and footers, removing headers and footers, reducing the size of text, increasing the size of text, replacing a typeface of the text such as a font, removing colored page borders, removing pages fills, removing shape fills, removing table fills, changing the page orientation, scaling to print multiple pages per sheet and/or arranging the text into multiple columns.

Figure 2:
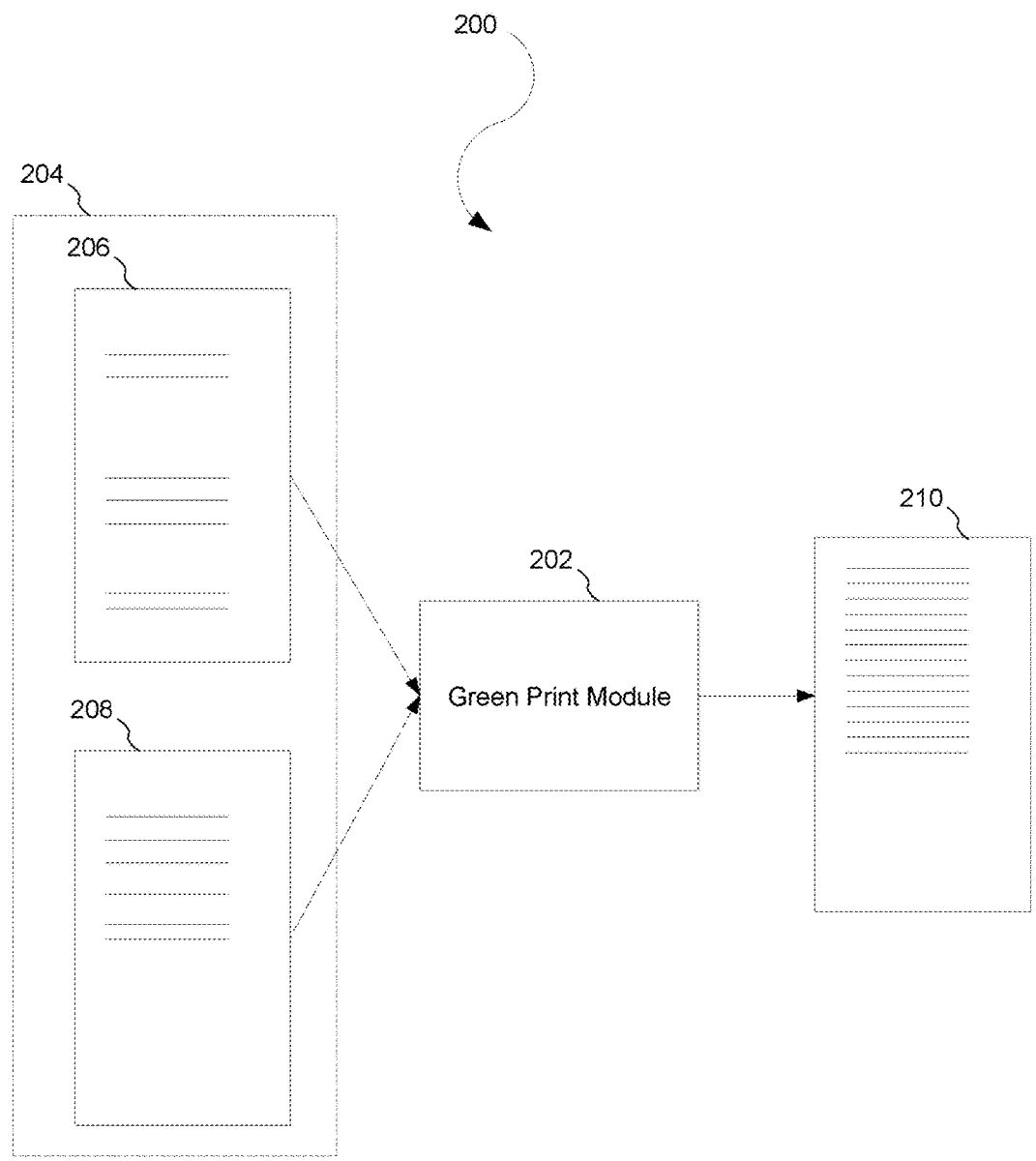
FIG. 2 illustrates a green print module that may be utilized with the green printing configuration.

FIG. 2 illustrates a green print module 202 that may be utilized with the green printing configuration 100. The green print module may be stored in the computing device 102 or the printer 104. The green print module 202 may analyze the content of multiple pages, sections, etc. of a word processing document to repurpose the content to save paper and/or ink. For example, the green print module 202 may analyze a first page 206 and a second page 208 of a word processing document 204. The green print module 202 may then repurpose the content of the word processing document 204 so that a green word processing document 210 may be printed. The green word processing document 210 has a repurposed page 210 that has the content from the first page 206 and the second page 208 in a readable format. Lines are provided in a document as illustrated in drawings such as FIG. 2 to represent text, symbols, shapes, images, and/or the like.

Figure 3:
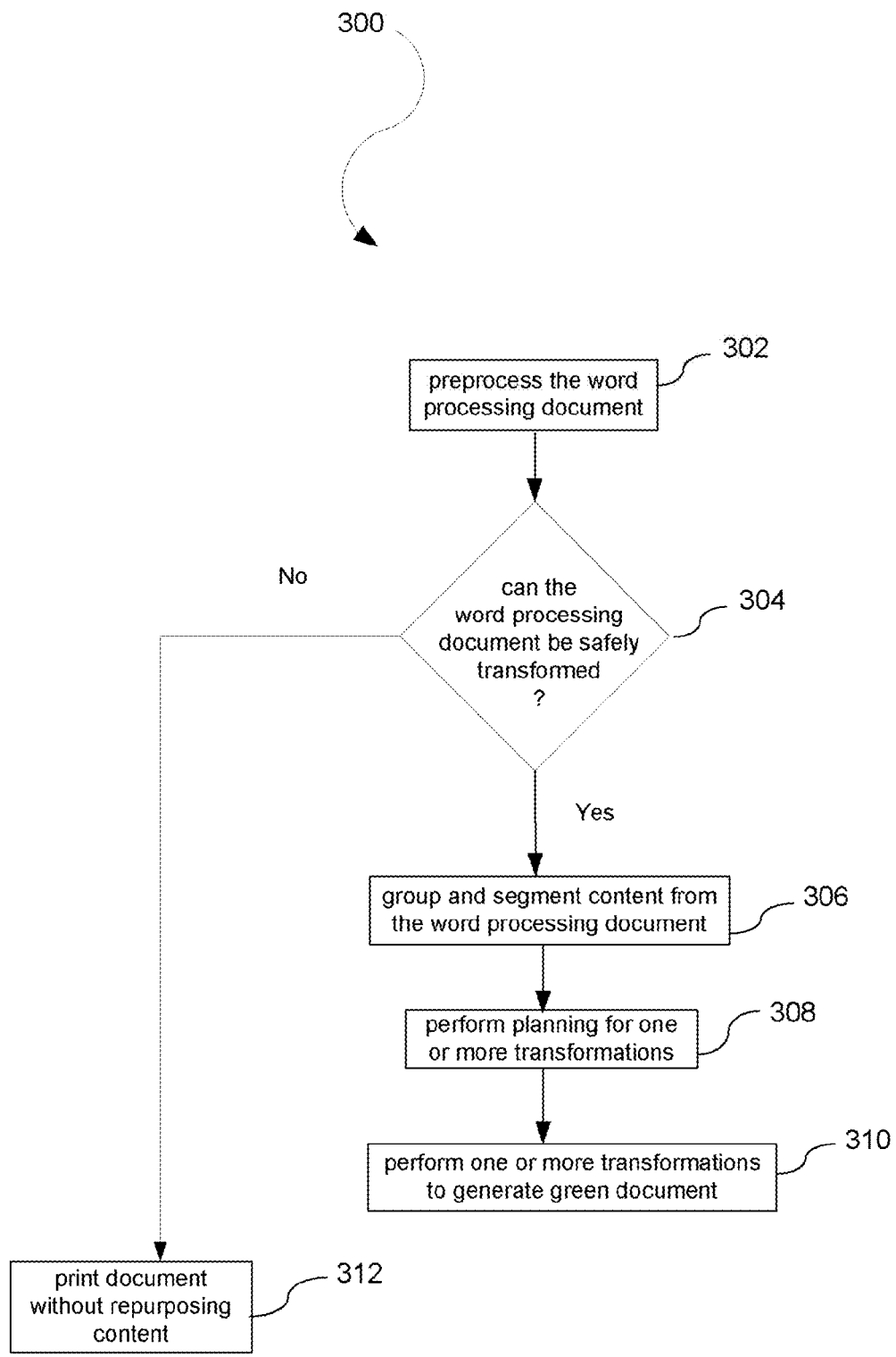
FIG. 3 illustrates a process that is utilized by the green print module illustrated in FIG. 2 to analyze a word processing document for the purpose of selecting one or more transformations to the word processing document for green printing.

FIG. 3 illustrates a process 300 that is utilized by the green print module 202 illustrated in FIG. 2 to analyze a word processing document for the purpose of selecting one or more transformations to the word processing document for green printing. At a process block 302, the process 300 preprocesses the word processing document to ensure that the word processing document 204 may be safely transformed. The process 300 advances to a decision block 304 to determine if the word processing document can be safely transformed. If the process 300 determines that transformation to a green word processing document would potentially lead to some loss of information, e.g., an image obscured by some text, and/or the transformation would lead to a green documentation is not readable and aesthetically pleasing, the process 300 advances from the decision block 304 to a process block 312 to print the document without repurposing the content. Alternatively, if the process 300 determines that transformation to a green word processing document would be safe, the process 300 advances to a decision block 306 to group and segment content from the word processing document. Logical groups of content are formed to stay together during transformation. In one embodiment, a set of grouping rules is utilized. For example, content that is adjacent and possibly on the same page stay together during the transformation. As a result, both the appearance of the green document and size reduction of the content are managed. In another embodiment, a set of region identification rules is utilized. The content blocks may be labeled to identify what they represent semantically so that the cost of applying transformations to the content blocks may be evaluated. The semantic labeling may be based on labels that are utilized with a particular word processing software program and the related structured document formats. In one embodiment, the document is segmented into regions of homogeneous characteristics. For example, the document may be segmented into text regions, text regions with small images, text regions with tables, etc. The process 300 utilizes green printing to apply transformations based on the type of region. Some regions may undergo similar and/or different types of transformations as other regions. The process 300 then advances to a process block 308 to perform planning for one or more transformations. The planning may include an analysis of different potential green printouts. Finally, the process 300 advances to a process block 310 to perform one or more transformations to generate the green document.

Figure 4:
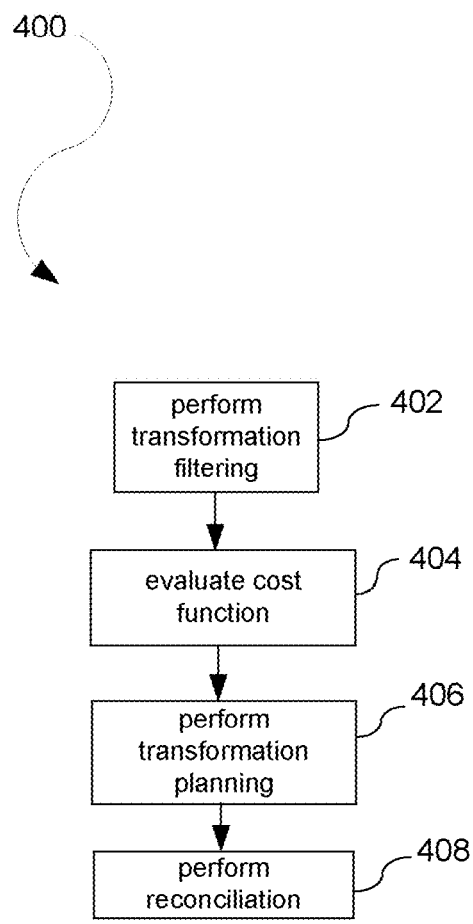
FIG. 4 illustrates a subprocess that may be utilized to perform the planning of the process block as illustrated in FIG. 3.

FIG. 4 illustrates a subprocess 400 that may be utilized to perform the planning of the process block 308 as illustrated in FIG. 3. Not all transformations can be applied to all kinds of regions. For example, a multicolumn layout transformation cannot be applied to a wide table. Accordingly, at a subprocess block 402, the subprocess 400 performs an action filtering for the particular document. The action filtering procedure filters potential transformations for a particular document based on a set of rules and the types of regions present in the document. The set of rules may include restrictions of certain transformation types based on certain region types. At a subprocess block 404, a cost function is evaluated. The cost function is utilized to predict the cost of each potential transformation that may be applied to the document. The cost is based on one or more aesthetic measures for a word processing document. The aesthetic measures may include edge alignment of content, separation of distinct objects, character legibility, line readability, content balance, and color richness. An example of a cost function is the approximate pagination. In one embodiment, the transformation types are flattened into a single list. The cost for each transformation type may then be computed. The transformations are then ranked according to cost. In one embodiment, the ranking is ordered in the increasing order of costs. The maximum possible cost for the document is determined by adding up the cost of all the transformations and dividing by the number of regions in the document. This maximum possible cost represents the total risk of appearance distortion associated with transforming the document to its minimal form for printing.

In one embodiment, a word processing document may be modeled as a sequence $R=(R_1, R_2, \ldots, R_n)$ of document regions. For green printing, the document undergoes a sequence of transformations $(T_1, T_2, \ldots, T_m)$ on these regions. A single transformation $T_i$ on a region $R_j$ is a mapping from domain $T_i$ to $R_j$. When a transformation is applied, the influence on the region and the overall document is measured utilizing a cost function. A region has a set of measurable base attributes that uniquely characterize the region. The measurable base attributes include average line length, mean and variance of left edge positions, mean and variance of right edge positions, mean and variance of text sizes in the region, and/or minimum and maximum paragraph indents in the regions. These attributes $A=\{A_1, A_2, \ldots, A_k\}$ are utilized to gauge the appearance of the region. A transformation $T_k$ on a region $R_j$ is represented as $R_j'=T_k(R_j)$. The transformation can be rewritten as $A'=T_k(A)$ for a given A as the region $R_j$ is characterized by its base attributes. A set of appearance attributes $P=\{P_1, P_2, \ldots, P_p\}$ may also be defined such that $P_i$ is a real function from A to [0,1]. These appearance attributes determine such factors as balance, object separation, alignment, and line readability. For example, the readability of a line of text depends upon the legibility of the text (font size), on the separation of the line from the rest of the lines, and the length. This information may be encoded in the set of functions P.

By utilizing the cost function, a determination may be made as to how each transformation affects the aesthetic measures in different regions of the word processing document and/or the word processing document as a whole. Based on this analysis, one or more scores may be assigned to each transformation. Each score signifies the influence of that transformation on the particular aesthetic measure. For example, a transformation may have a first score for edge alignment of content and a second score for separation of distinct objects. Further, the scores for a transformation may be weighed according to weightings that are generated for the aesthetic measures. For example, experiments may be conducted to determine what aesthetic measures are more important than others to users. The aesthetic measures may then be weighted in accordance with the resulting data. In one embodiment, the total score for a sequence of transformations is calculated as the sum of the individual scores for each attribute. In another embodiment, the total score for a sequence of transformations is a weighted sum of the attribute scores.

The cost function may involve other types of calculations. For example, for all blocks of content that lie above a block which has a stay together requirement such as in the case of a fill-in form, an additional cost results from transformations that reduce the size of the content. The reason for this additional cost is the increased likelihood that the fill-in form may straddle multiple pages from such a reduction in pages.

The scores allow for a ranking of transformation for any given region in the word processing document. In one embodiment, a threshold is established for applying transformations. In one configuration, the threshold is established to maximize the utilization of pages so that none of the pages of the word processing document remain under-full. This fit-to-page approach attempts to fit content into an integer number of pages. In one embodiment, a pagination module implements the fit-to-page approach by approximating the number of pages that will be occupied by each region. Accordingly, the number of pages that the word processing document will be printed may be predicted with some level of accuracy.

The subprocess 400 then moves to a subprocess block 406 to perform transformation planning. Based on the scores, the subprocess 406 may select the transformations that are most suitable for green printing. In one embodiment, the transformations are applied to content blocks in a specific order. As a result, a portion of the transformations at the end of the order may not be necessary to reduce paper and/or ink and may then potentially be omitted so that the remaining portion is printed according to the original format.

The word processing document may be printed in whole or in part, e.g., a range of pages or selected portion of the word processing document. If the document is printed as a whole word processing document, the subprocess 400 moves to a subprocess block 408 to perform reconciliation. The different parts of the word processing document should not have drastically different formatting. Transformations planned for different regions in a word processing document are reconciled to manage the overall appearance of the word processing document. For example, if one region is text rich and is planned to be arranged into multiple columns, the reconciliation ensures that either the region is large enough to exist separately or that the multiple column transformation is not performed.

In one embodiment, the planning for transformations for green printing are analyzed per region as different regions may involve different transformations or possibly no transformations at all. For example, a transformation to a particular text region may reduce the amount of paper and/or ink while keeping the content readable whereas a transformation to a particular table region may obscure the table. As a result, the transformation for the text region may be applied without the transformation to the table region.

FIG. 5A illustrates an example of a first page 500 of a word processing document in an original format. Further, FIG. 5B illustrates an example of a second page 550 of the word processing document in the original format. FIG. 5C illustrates a word processing green document 575 after green printing transformations have been applied to the first page 500 and the second page 550 of the word processing document in the original format.

With respect to the appearance attributes P, an optimal range may be utilized for each appearance attribute, e.g., text size. For example, text blocks with characters that are either too small or too large are not very readable. As a further example, lines of lengths between forty to sixty characters are the most readable. As yet another example, lines of text with line spacing that is too large or too small are not very readable. In one embodiment, a plurality of functions may be utilized as follows: $P_i(x)=1$ if $x \in [x_1, x_2]$, $P_j(x)=q(x-x^1)/k$ if $x<x_1$, and $P_j(x)=q(x^2-x)/k$ if $x>x_2$. The variable x is the value of the base attribute in question whereas the q and k are suitable constants. The values of x1 and x2 are left configurable for each of the different appearance attributes in P.

Figure 6:
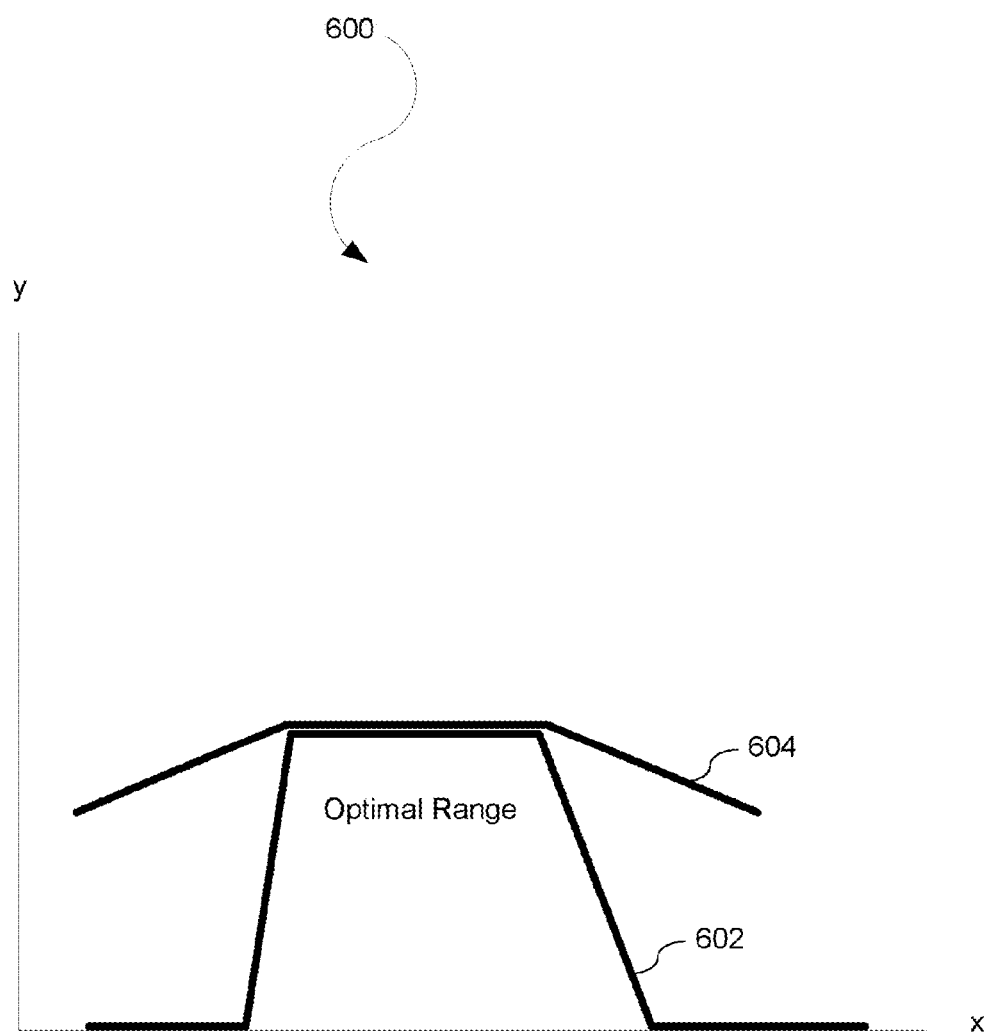
FIG. 6 illustrates a graph of the appearance attributes.

FIG. 6 illustrates a graph 600 of the appearance attributes. The graph 600 illustrates an approximated set of values 602 and an expected set of values 604. Further, the graph 600 illustrates the set of values that fall in the optimal range. In one embodiment, the approximated function is $P_i(x)=1$ if $x\in[(x_1-\delta_1), (x_2+\delta_2)]$ and 0 otherwise. The approximated function evaluates to 1 if some specific parameters are in their optimal ranges and to 0 otherwise. Based on these appearance attributes, a pseudo-appearance score is defined: $S=\Sigma(w_i P_i(A))$ such that $0<=w_i<=1$. The pseudo-appearance score represents the relative importance of the transformation. As a transformation $T_k$ modifies the base attributes of a region, i.e., $A'=T_k(A)$, the appearance score for the transformation $T_k$ may be defined as $\Delta S=\Sigma(w_i(P_i(A')-P_i(A))$.

Figure 7:
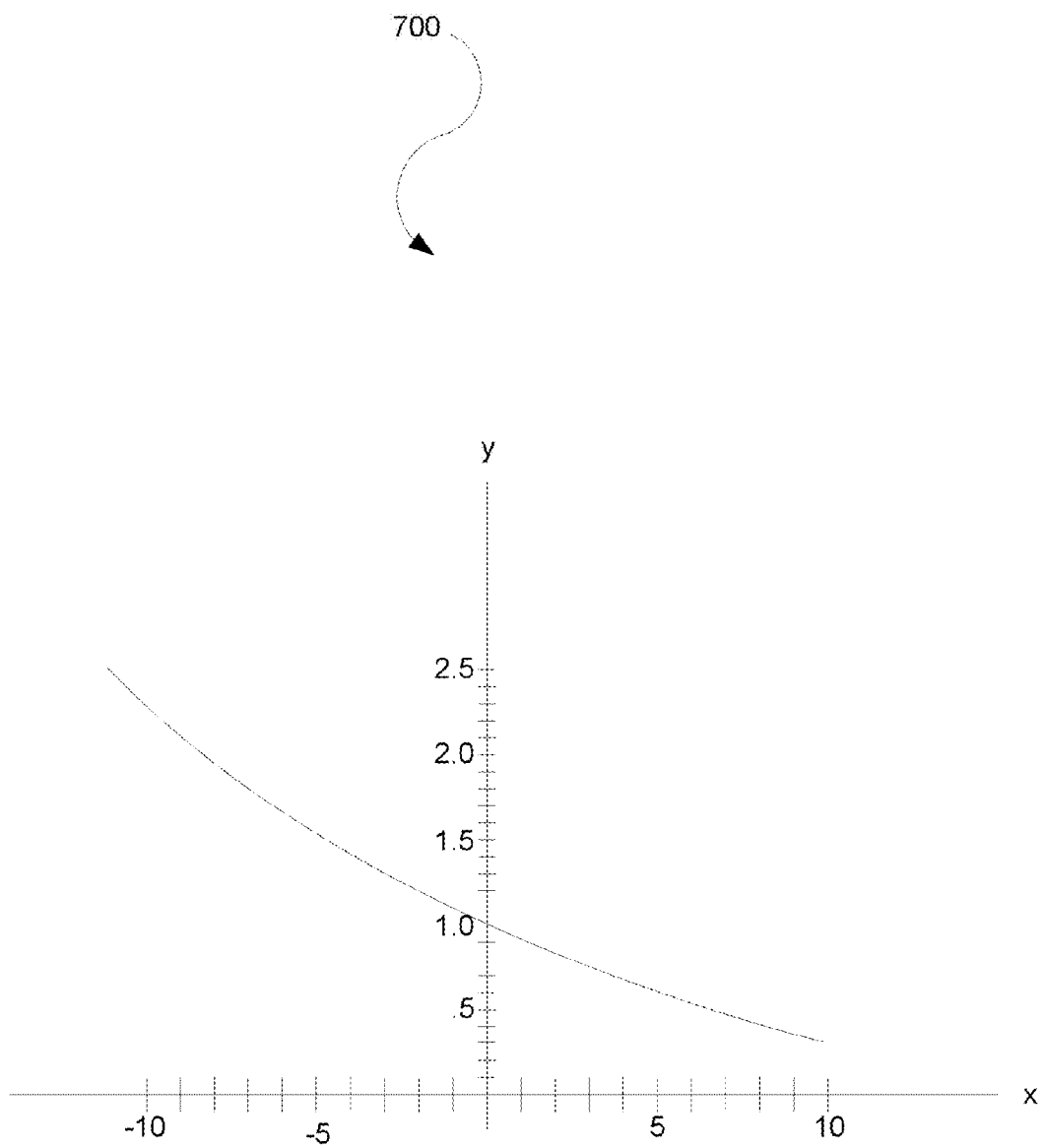
FIG. 7 illustrates a graph that plots the cost of a transformation C(T) on total change in appearance ΔS.

FIG. 7 illustrates a graph 700 that plots the cost of a transformation C(T) on total change in appearance $\Delta S$. Applying C(T) on a specific region may be defined as $C(T)=ke^{-\Delta S}=ke^{-\Sigma(wi(Pi(A')-Pi(A))}$. The maximum risk per region associated with transforming the document to its minimal state is then determined as $Cmax(C)=(C(T_1)+C(T_2)+ \ldots C(T_n))/|R|$.

The costs for each transformation may be determined and utilized [[a]] as ranks for ordering purposes, i.e., (T1', T2', . . . , Tm') in the increasing order of costs. For a given group of settings for the green printing system, an average risk can be determined based on a distribution of document types, e.g., text only, text and graphics, etc., in the printing environment. An administrator or user may then easily detect the group of settings suitable to the particular environment. For an organization, when an administrator wishes to set a definite level of allowed distortion, the administrator may specify this value in a percentage. The percentage value can be utilized to determine the threshold total cost per region for the transformations. Accordingly, when the ordered transformations are being applied, the ordered transformations can be cut off at a point when they reach this threshold value. With respect to implementing the fit-to-page approach, the optimum number of pages to print a green document is first determined. The transformations T1', T2', . . . , and Tk' are then applied or simulated until the threshold number of pages is achieved.

To determine if a word processing document needs to be and can be transformed, the number of pages that are necessary to print the green document after the transformations is predicted. For example, if the number of pages does not change after a safe transformation, then the original document does not need to be green printed. An example is a document that originally would only have to be printed on one page. Further, constraints such as the smallest text size in the document or the desired page orientation are externally specified. In one embodiment, a pagination module is utilized to quickly determine the optimal number of pages necessary to print a document with given constraints. The pagination module allows a break-off in processing during green printing. The estimate for the optimum number of pages helps the green printing configuration 100 determine quickly if there is further necessity in applying transformations to a word processing document. In one embodiment, the pagination module allows a user to evaluate a green level of the green document. In other words, a user can determine the percentage of the pages that may be saved by utilizing green printing.

In one embodiment, the document may be represented as a flattened tree of parameters representing formatting at every leaf node. The pagination module simulates the way that a word processor lays out content on pages. However, the pagination module may not utilize layout decisions that do not typically affect the number of lines of text in a page such as justification, kerning, etc. The pagination module accepts the flattened document tree as input and determines the number of pages necessary to green print the word processing document. The pagination module incorporates changes to the calculations for a transformed document. For example, if blank lines are removed from some part of the document, the pagination engine simply recalculates the change in the number of pages from that point onwards. Further, the pagination module is able to localize changes that do not affect other regions.

Figure 8:
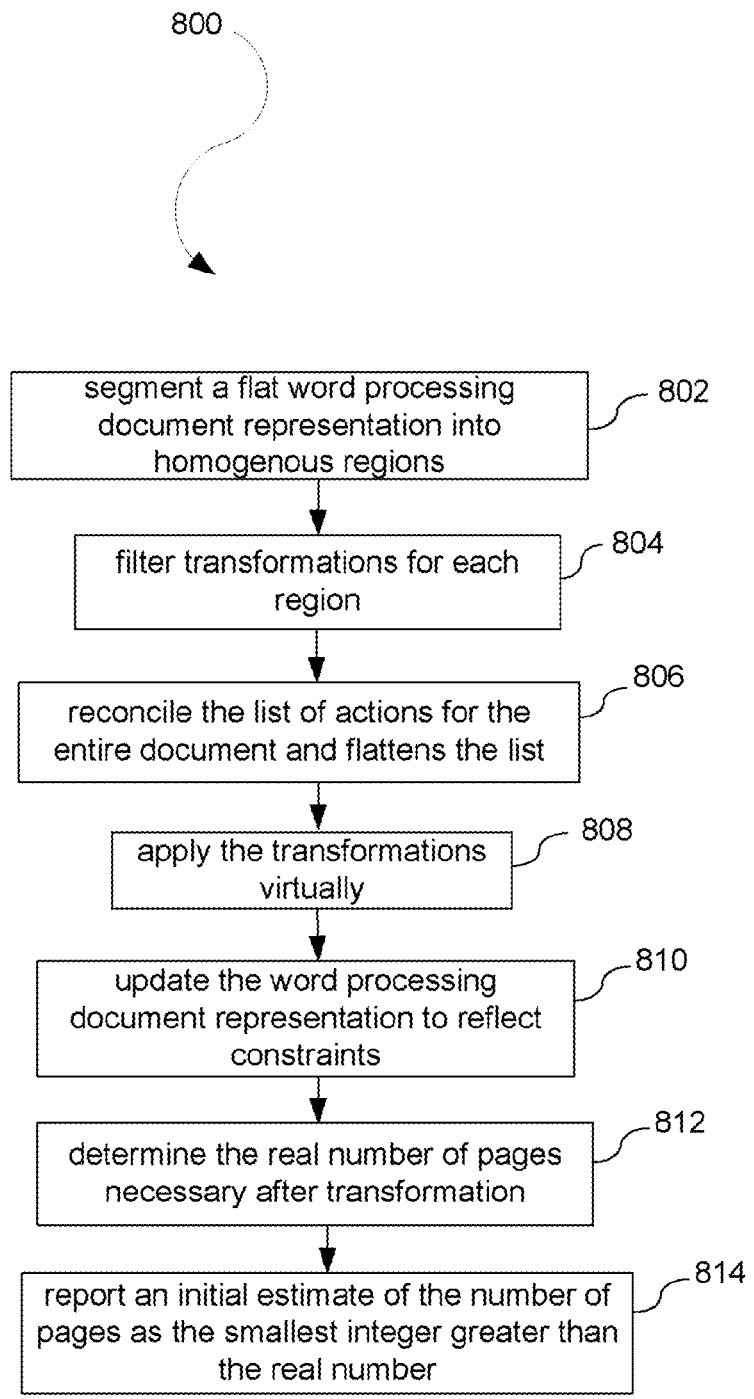
FIG. 8 illustrates a process utilized by the pagination module to green print the document with transformations and specified constraints.

FIG. 8 illustrates a process 800 utilized by the pagination module to green print the document with transformations and specified constraints. The set of specified constraints may be called C. At a process block 802, the process 800 segments the flat word processing document representation, which may be called D, into homogenous regions. A list of regions R in the word processing document may be tabulated. At a process block 804, the process 800 filters transformations, which may also be called actions, for each region. The list of actions filtered for region $R_i$ may be called $A[R_i]$. Further, at a process block 806, the process 800 reconciles the list of actions for the entire document and flattens the list. The flat list of all actions may be called T. In addition, at a process block 808, the process 800 applies the transformations virtually, i.e., updates all the formatting attributes in the flat word processing document representation D. At a process block 810, the process 800 updates the word processing document representation D to reflect constraints specified in C. Further, at a process block 812, the process 800 determines the real number of pages necessary after transformation. In addition, at a process block 814, the process 800 reports an initial estimate of the number of pages as the smallest integer greater than the real number, which is a ceiling.

The value reported by the process 800 is updated while processing if the list of actions for the word processing document contains an action that scales the content to print on multiple pages per sheet. In one embodiment, the estimate is then revised by rounding off the number to the nearest, i.e., greater, multiple of the number of pages per sheet.

Figure 9:
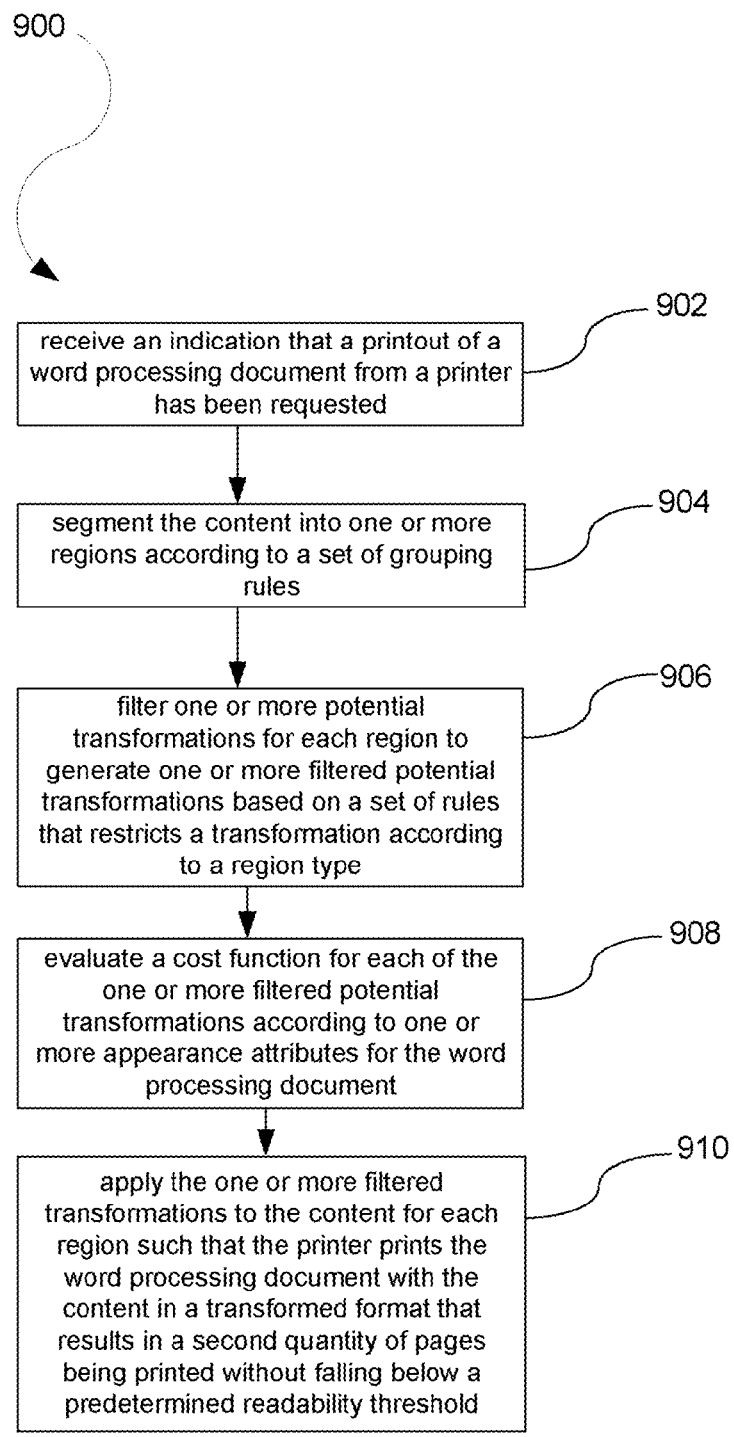
FIG. 9 illustrates a process that may be utilized to repurpose a word processing document.

FIG. 9 illustrates a process 900 that may be utilized to repurpose a word processing document. At a process block 902, the process 900 receives an indication that a printout of a word processing document from a printer has been requested. The word processing document has content with a format that would result in a first quantity of pages being printed. Further, at a process block 904, the process 900 segments the content into one or more regions according to a set of grouping rules. The set of grouping rules defines a region has having at least one homogeneous characteristic. In addition, at a process block 906, the process 900 filters one or more potential transformations for each region to generate one or more filtered potential transformations based on a set of rules that restricts a transformation according to a region type. The region type is determined by the at least one homogeneous characteristic for each region. Further, at a process block 908, the process 900 evaluates a cost function for each of the one or more filtered potential transformations according to one or more appearance attributes for the word processing document. In addition, at a process block 910, the process 900 applies the one or more filtered transformations to the content for each region such that the printer prints the word processing document with the content in a transformed format that results in a second quantity of pages being printed without falling below a predetermined readability threshold. The second quantity of pages is less than the first quantity of pages.

By automatically reducing the number of pages from the original format that results in a first quantity of printed pages to a repurposed format that results in a second quantity of pages, the original appearance of the word processing document is lost. Accordingly, the trade-off between the appearance of the word processing document and the amount of savings achieved from green printing is quantified according to a repurposing quantifier. In one embodiment, the appearance of the document is quantified in terms of aesthetic attributes and a measure of the influence of one or more transformations on the word processing document. In one embodiment, a readability threshold may be established to specify the degree to which the appearance of the document may be degraded for the purpose of green printing. Further, the document may be automatically repurposed without the distortion falling below the readability threshold. The readability threshold may be based one or more readability rules. Instead of basing the readability threshold on a subject measure of appearance, the readability threshold is based on specific measurements from the word processing document. Those specific measurements are utilized to determine the risks associated with transforming certain portions of the document in view of the readability rules.

Figure 10:
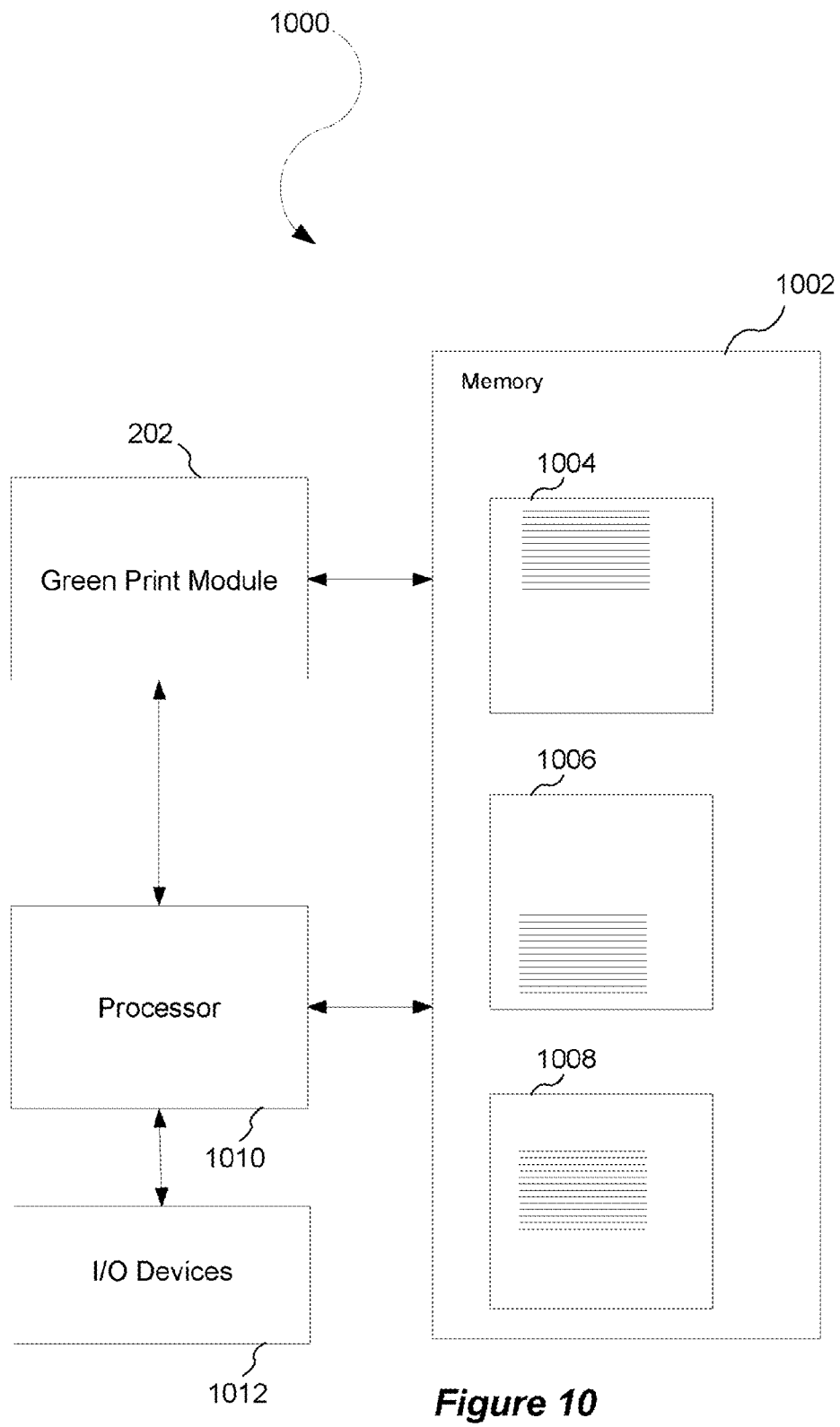
FIG. 10 illustrates a system configuration that may be utilized for green printing.

FIG. 10 illustrates a system configuration 1000 that may be utilized for green printing. In one embodiment, the green print module 202 interacts with a memory 1002. The green print module 202 generates a variety of potential repurposed documents that meet the readability threshold. For example, a first potential repurposed word processing document 1004 may have text according to one format that meets the readability threshold, a second potential repurposed document 1006 may have text according to another format that meets the readability threshold, and a third potential repurposed document 1008 may have text according to yet another format that meets the readability threshold. The green print module may select one final repurposed document from these potential repurposed documents by utilizing the repurposing quantifier. The repurposing quantifier may be the result of an equation that is based on the number of pages reduced and the degradation of the readability. Even if all of the potential repurposed documents meet the readability threshold, a higher score will generally be given to a first repurposed document that degrades readability less than a second repurposed document with the same number of reduced pages. Further, even if all of the potential repurposed documents meet the readability threshold, a higher score will generally be given to a first repurposed document that reduces more pages than a second repurposed document with the same readability degradation. In other words, the highest score will be given to the potential repurposed document that as a whole minimizes readability degradation and maximizes page reduction better than the other potential repurposed documents.

After the green print module 202 selects a potential repurposed document, the green print module 202 provides the repurposed document to a processor 1010. Further, the processor 1010 applies the transformations in the potential repurposed document to the document so that the user may print the final repurposed document. The processor 1010 interacts with input/output ("I/O") devices 1012. For example, the processor 1012 receives an input from a user through a keyboard to print the document. The processor 1012 may then print the repurposed document on a printer.

In another embodiment, a green score may be indicated for a word processing document. The system configuration 100 may inform a user how green the word processing document is by utilizing any of the scoring methodologies described herein. In other words, a display device may provide a user with an indication of what changes the user can make to the word processing document to save paper and/or ink. The indication may be provided during the user's editing of the word processing document. Alternatively, the indication may be provided to the user when the user is not editing the word processing document.

In one embodiment, the system configuration 1000 is suitable for storing and/or executing program code and is implemented using a general purpose computer or any other hardware equivalents. The processor 1010 is coupled, either directly or indirectly, to the memory 1002 through a system bus. The memory 1002 can include local memory employed during actual execution of the program code, bulk storage, and/or cache memories which provide temporary storage of at least some program code in order to reduce the number of times code must be retrieved from bulk storage during execution.

The I/O devices 1012 can be coupled directly to the system 1000 or through intervening input/output controllers. Further, the I/O devices 1012 can include a keyboard, a keypad, a mouse, a microphone for capturing speech commands, a pointing device, and other user input devices that will be recognized by one of ordinary skill in the art. Further, the I/O devices 1012 can include output devices such as a printer, display screen, or the like. Further, the I/O devices 1012 can include a receiver, transmitter, speaker, display, image capture sensor, biometric sensor, etc. In addition, the I/O devices 1012 can include storage devices such as a tape drive, floppy drive, hard disk drive, compact disk ("CD") drive, etc.

Network adapters may also be coupled to the system configuration 1000 to enable the system configuration 1000 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A computer-readable storage medium comprising stored instructions that are executable and, responsive to execution of the instructions by a computing device, the computing device performs operations to:
   receive an indication that a printout of a word processing document from a printer has been requested, the word processing document having content with a format that would result in a first quantity of pages being printed;
   segment the content into one or more regions according to a set of grouping rules, the set of grouping rules defining a region having at least one homogeneous characteristic;
   filter one or more potential transformations for each region to generate one or more filtered transformations based on a set of rules that restricts a transformation according to a region type, the region type being determined by the at least one homogeneous characteristic for each region;

evaluate a cost function for each of the one or more filtered transformations to determine an appearance effect on one or more appearance attributes for the word processing document;

reject one or more of the filtered transformations to the word processing document that will result in a loss of information including at least one of unreadable text or an image obscured by text; and apply one or more of the filtered transformations that are not rejected to the content individually for each region to print the word processing document with the content in a transformed format that results in a second quantity of pages being printed without falling below a predetermined readability threshold, the second quantity of pages being less than the first quantity of pages.

2. The computer-readable storage medium of claim 1, wherein the at least one homogeneous characteristic of the region is text.

3. The computer-readable storage medium of claim 1, wherein the at least one homogeneous characteristic of the region is text of a predetermined size.

4. The computer-readable storage medium of claim 1, wherein the computing device performs the operations further comprising to determine a cost from the cost functions for each of the one or more filtered transformations, wherein the cost represents a total risk of appearance distortion associated with transforming the word processing document to a minimal form for printing.

5. The computer-readable storage medium of claim 1, wherein the at least one homogeneous characteristic of the region is text with an image or text with a table.

6. The computer-readable storage medium of claim 1, wherein the computing device performs the operations further comprising to label the one or more regions so that the at least one homogeneous characteristic associated with each region is identified.

7. The computer-readable storage medium of claim 1, wherein the one or more appearance attributes includes legibility of text.

8. The computer-readable storage medium of claim 1, wherein the one or more appearance attributes includes line separation.

9. The computer-readable storage medium of claim 1, wherein the computing device performs the operations further comprising to estimate an optimum number of the second quantity of pages prior to the application of the one or more filtered transformations.

10. The computer-readable storage medium of claim 1, wherein the computing device performs the operations further comprising to determine a green score of the word processing document.

11. A method comprising:

receiving an indication that a printout of a word processing document from a printer has been requested, the word processing document having content with a format that would result in a first quantity of pages being printed;

segmenting the content into one or more regions according to a set of grouping rules, the set of grouping rules defining a region having at least one homogeneous characteristic;

filtering one or more potential transformations for each region to generate one or more filtered transformations based on a set of rules that restricts a transformation according to a region type, the region type being determined by the at least one homogeneous characteristic for each region;

evaluating a cost function for each of the one or more filtered transformations according to one or more appearance attributes for the word processing document, a sum of the cost functions for the one or more filtered transformations representing a total risk of appearance distortion associated with transforming the document;

rejecting one or more of the filtered transformations to the word processing document that will result in a loss of information including at least one of unreadable text or an image obscured by text; and applying one or more of the filtered transformations that are not rejected to the content individually for each region to print the word processing document with the content in a transformed format that results in a second quantity of pages being printed without falling below a predetermined readability threshold, the second quantity of pages being less than the first quantity of pages.

12. The method of claim 11, wherein the at least one homogeneous characteristic is text.

13. The method of claim 11, wherein the at least one homogeneous characteristic is text of a predetermined size.

14. The method of claim 11, wherein the at least one homogeneous characteristic is text with an image.

15. The method of claim 11, wherein the at least one homogeneous characteristic is text with a table.

16. The method of claim 11, further comprising labeling the one or more regions so that the at least one homogeneous characteristic associated with each region is identified.

17. The method of claim 11, wherein the one or more appearance attributes includes legibility of text.

18. The method of claim 11, wherein the one or more appearance attributes includes line separation.

19. The method of claim 11, further comprising estimating an optimum number of the second quantity of pages prior to the application of the one or more filtered transformations.

20. A system comprising:

a memory configured to store a word processing document;

a processor to implement a green print module that is configured to:

receive a print job to print a word processing document from a printer;

segment content of the word processing document into one or more regions according to a set of grouping rules that define a region having at least one homogenous characteristic, the word processing document having the content with a format that would result in a first quantity of pages being printed;

filter one or more potential transformations for each region to generate one or more filtered transformations based on a set of rules that restricts a transformation according to a region type that is determined by the at least one homogeneous characteristic for each region;

evaluate a cost function for each of the one or more filtered transformations according to one or more appearance attributes for the word processing document, a sum of the cost functions for the one or more filtered transformations representing a total risk of appearance distortion associated with transforming the document;

reject one or more of the filtered transformations to the word processing document that will result in a loss of information including at least one of unreadable text or an image obscured by text; and apply one or more of the filtered transformations that are not rejected to the content individually for each region to print the word processing document with the content in a transformed format that results in a second quantity of pages being printed without falling below a predetermined readability threshold, the second quantity of pages being less than the first quantity of pages.

* * * * *